March 11, 1941.　　　K. C. MARKLEY　　　2,234,570
AMPERE DEMAND INDICATOR
Filed Nov. 1, 1939　　　2 Sheets-Sheet 1

Inventor
Kenneth C. Markley
By Shepherd & Campbell
Attorneys

March 11, 1941.　　　K. C. MARKLEY　　　2,234,570
AMPERE DEMAND INDICATOR
Filed Nov. 1, 1939　　　2 Sheets-Sheet 2
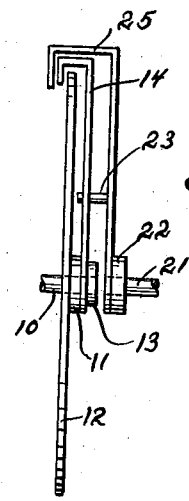
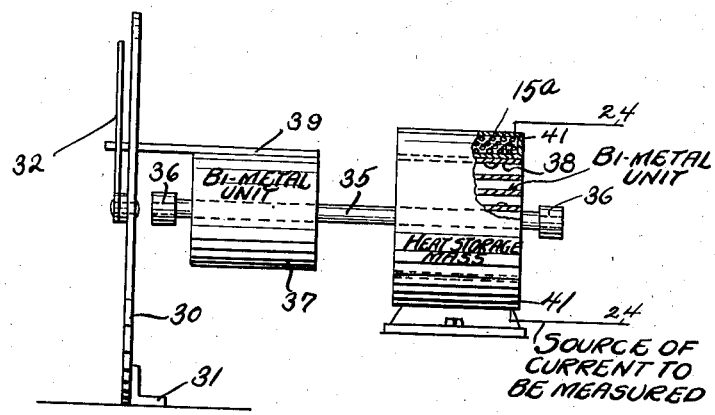
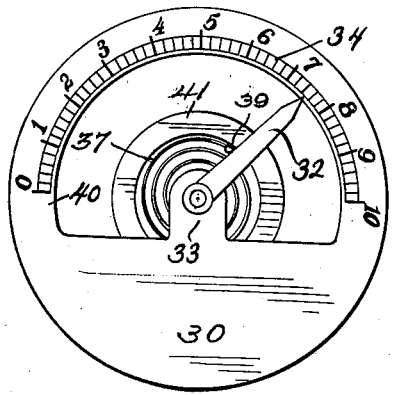
Inventor
Kenneth C. Markley
By Shepherd & Campbell
Attorneys Patented Mar. 11, 1941

2,234,570

UNITED STATES PATENT OFFICE 2,234,570

AMPERE DEMAND INDICATOR

Kenneth C. Markley, Huntingdon Valley, Pa., assignor to The Eastern Specialty Company, Philadelphia, Pa., a corporation of Pennsylvania Application November 1, 1939, Serial No. 302,447

4 Claims. (Cl. 171—95)

The primary object of the present invention is to provide an improved ampere demand indicator, of such simplicity and ruggedness of construction that not only may great economies in initial cost and installation be effected, but also maintenance costs may be reduced to a mere fraction of the present costs of maintenance.

Practically all of the demand measurements as applied commercially in the measurement of electrical energy by public service companies supplying electricity to consumers read in terms of kilowatt or watt demand. The demand finding mechanisms which have heretofore been employed have been extremely complicated, are very costly, and involve a very considerable expense in the maintenance and servicing of the same.

There is at present a trend toward the measurement of lower units of demand, and this will, of necessity, involve the use of very large numbers of demand measurement appliances or meters. The present invention contemplates the use of a demand measurement mechanism which will indicate the demand in terms of amperes rather than in terms of kilowatts or watts.

Ampere demand measurements makes possible the utilization of much cheaper and more rugged devices than those used at present to measure watts demand, while at the same time more completely covering the original object sought through demand measurement, namely: the protection of the company producing and selling energy against overloading of its lines by any particular customer without corresponding compensation.

The present watts demand devices are of two general classes, one of them purely mechanical, involving a complexity of gears, clutches, etc., and an electric timing motor; the other general classification being thermal watt demand meters involving the use of bimetallic strips, Bourdon tubes, etc., complicated by the introduction of the necessary electrical components (transformers) to make possible the measurement in true watts. It follows that a device which will measure thermally the heating effect of current, only, can be made much more simply than the watts demand devices above mentioned.

Structures illustrative of the principles of the invention are illustrated in the accompanying drawings, in which:

Fig. 5 is a side elevation illustrating a modification of the pointer arrangement of Fig. 1;

Fig. 6 is a side view illustrating a further modification of the invention, and

Fig. 7 is an elevation looking toward the right in Fig. 6.

Like numerals designate corresponding parts throughout the several figures of the drawings.

Figure 1:
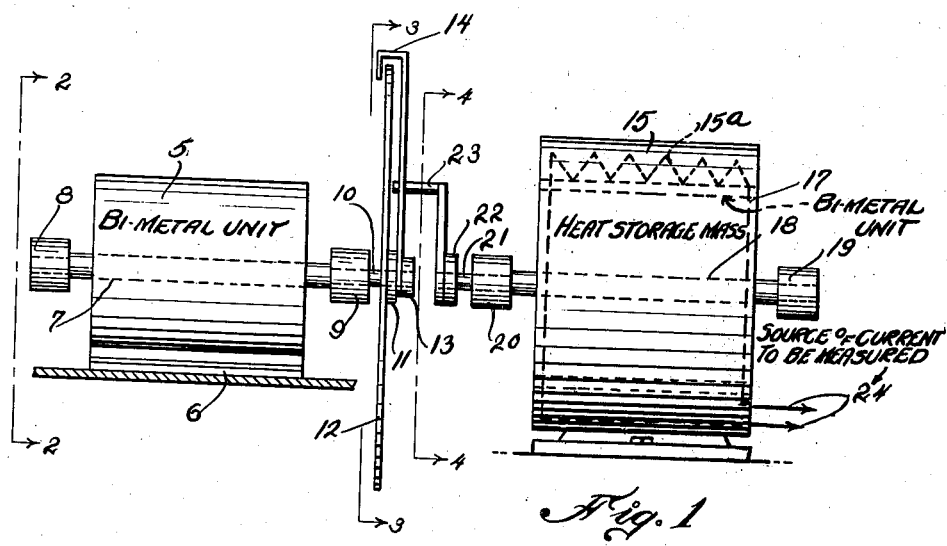
Fig. 1 is a side view of an ampere demand indicator constructed in accordance with the invention.
Figure 3:
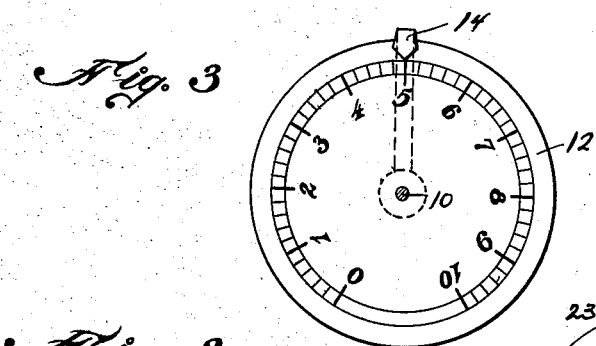
Fig. 3 is a vertical sectional view on line 3—3 of Fig. 1.
Figure 2:
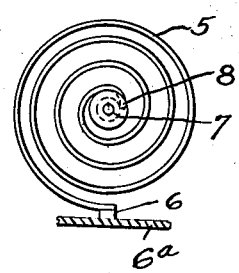
Fig. 2 illustrates one of the heat responsive units hereinafter described.
Figure 4:
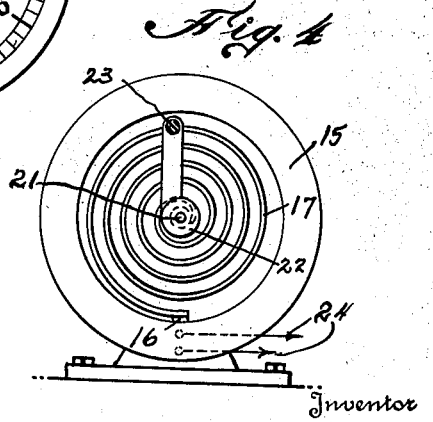
Fig. 4 is a sectional view on line 4—4 of Fig. 1.

Referring to the drawings, and particularly to Figs. 1 to 4, a strip of bimetal 5, comprising the ambient temperature compensating element, is rigidly fastened at its outer end to a portion 6 of the supporting structure 6ª, the innermost end of bimetallic strip 5 being fastened to central shaft 7 and said shaft being journaled in fixed bearings 8 and 9.

A projection 10 of shaft 7 carries a hub 11 and light disc 12, said hub and disc being firmly fixed upon shaft projection 10. A hub 13 and indicating pointer 14 are rotatably mounted upon shaft projection 10 so as to be relatively free to rotate but with a light friction fit. The degree of friction is such that when shaft 7 and disc 12 are rotated, pointer 14 will be carried around with said shaft and disc, but may be deflected to any other position relative to disc 12 upon the application of an external force. A thermal jacket 15, comprising an electrical resistance winding 15ª and a retaining shell or jacket, provides a mass of such a nature as to develop the desired thermal time lag.

It is not desirable that momentary fluctuations of the ampere load be imposed as a maximum reading upon the indicator, but upon the contrary, only the maximum demand which has been maintained over a reasonable period of time should be indicated by the indicator. Usually a period of fifteen minutes is considered to be such a reasonable time, and the mass of the jacket 15 may be such as to reach maximum temperature in fifteen minutes, or any other selected time.

A spiral strip of bimetal 17, which is in every respect a duplicate of the bimetallic spiral 5, has its outer end fastened to the inner wall of jacket 15 at 16, and its inner end fastened to shaft 18. Shaft 18 is journaled in fixed bearings 19 and 20, so located that the shafts 7 and 18 will be concentric and parallel. A projection 21 of shaft 18 carries a hub 22 and pusher dog 23, both firmly fixed to shaft projection 21, the projecting end of dog 23 being so located that when shaft 18 is rotated, dog 23 may be brought into contact with one side of pointer 14 and may subsequently rotate pointer 14 relative to disc 12.

A calibrated scale is applied to one side of disc 12, the indicated values being made to correspond to the quantity being measured, which in this case would be the circuit demand in amperes. Electrical leads 24 connect the resistance wire 15a within thermal jacket 15 to the source of supply, which may be one side of the current coils of a watthour meter, the secondary of a separate current transformer, or the like.

The operation of the device is as follows:

Assume the device to be at room temperature, with pointer 14 set at the zero point of the scale. Assume also that no current flows in the device, that is, the circuit load is zero; under these circumstances, variations in ambient temperature will cause bimetal coils 5 and 17 to wind up or unwind by equal amounts and in the same direction, causing shafts 7 and 18, disc 12, pointer 14 and dog 23 all to rotate simultaneously and in the same direction, so that there is no relative motion between pointer 14 and disc 12, and pointer 14 remains at the zero of the scale. Consequently, variations in ambient temperature by themselves will cause no change in the indication of the device.

Assume now that the device is originally set at zero and then connected to the source of current. The resultant heat developed in the resistance winding of jacket 15 will cause the temperature of the latter to rise, and since jacket 15 effectively surrounds bimetal coil 17, the temperature of the latter will also rise, causing shaft 18 to rotate in a clockwise direction, when viewed in the direction of Figs. 2, 3 and 4. The rotation of shaft 18 will then cause pusher dog 23 to engage one side of pointer 14, causing pointer 14 to rotate clockwise and upscale, relative to disc 12, to an indicated value depending upon the degree of heat developed within jacket 15; or more specifically, to an indicated value depending upon the rise in temperature of jacket 15 above ambient temperature—said temperature rise being a function of the current flowing in the associated circuit.

For any given value of current in the associated circuit, there will then be a corresponding definite temperature rise within jacket 15, this rise in temperature approaching a maximum and equilibrium value, provided the current is held at a constant value, said maximum point being reached at the end of a period of time which, in demand meters of this general type, is referred to by those versed in the art as the "time interval." In consequence of the temperature rise occurring in jacket 15, for every steady and constant value of current there will be a definite angular rotation of shaft 18, and consequently a corresponding definite point on the calibrated dial to which pointer 14 will be advanced.

Assume, now, that the current to be measured is reduced below its previous value. Inspection of the direction of rotation of the parts shown in the figures will show that shaft 18 will rotate counter-clockwise relative to disc 12 and carry dog 23 in a direction which is downscale toward a lower indicated value. But since dog 23 can only exert a push upon pointer 14 in an upscale direction, any downscale motion of dog 23 merely causes the latter to move away from pointer 14 without influencing the previously determined location of said pointer. That is, an increase in current, if it be of sufficient magnitude, may further advance pointer 14 upscale, but a decrease in current imparts no motion to the pointer 14. It follows, therefore, that for any number of successive motions of dog 23 upscale or downscale, corresponding to successive increases or decreases in the magnitude of the current being measured, pointer 14 will indicate only the maximum value of the various upscale motions of dog 23, regardless of the order of their occurrence. It will be seen that this maximum value will be the maximum of all upscale motions of dog 23 which have occurred since the time of previous resetting of the indicating pointer 14. The reading of pointer 14 against the scale will then be the maximum demand in amperes.

In the case of rapid fluctuations in the current to be measured, the temperature rise of jacket 15 will be an integrated average or mean which will correspond to some particular equivalent value of steady or constant current.

A modification of the device is shown in Fig. 5, in which dog 23 is provided with an extension which is essentially a pointer 25 similar to pointer 14 and which overhangs the latter, both pointers being read against a common scale. The purpose of this arrangement is to enable the observer to read both the prevailing value of ampere demand and also the preceding maximum ampere demand.

Furthermore, although the field of greatest usefulness of the device is as an indicator of maximum ampere demand, it may readily be applied to the measurement of the demand of any other electrical quantity, such as the line voltage of the associated circuit, provided said electrical quantity can be converted into the heating of a single mass. Further, the principles involved may be utilized in the demand measurement of heat, from whatever source derived.

From the foregoing description, it will be seen that the structure herein shown and described provides very simple and inexpensive means for indicating the maximum ampere demand of an electric circuit since the time of last re-setting of the indicating pointer.

It is proposed to apply this device in addition to or in conjunction with a watthour meter, so as to leave an indication upon the indicator of the maximum ampere demand occurring during the meter-reading or billing period of a particular consumer of electrical energy. The actuation of the indicating element by thermal means, and the utilization of the heat storage properties of an effectively large mass, prevents the device from responding to instantaneous overloads.

An important feature of the invention is the manner in which it compensates for the effects of variation in ambient temperature. It will be observed that since the two thermally responsive devices, to wit; the spirals 5 and 17, are substantially identical in construction, one cancels the other in so far as the effect of ambient temperature is concerned, leaving only the temperature developed in jacket 15 finally operative upon the indicator.

Correction for variations of ambient temperature is of importance since otherwise an indicator located adjacent a boiler room, for example, might indicate a greater demand than another indicator located in a cool cellar even though the current flow might be the same in each case.

In the modification illustrated in Figs. 6 and 7, a fixed disc 30 is mounted upon a bracket 31 and a movable pointer 32 is mounted upon an ear 33 of the disc and moves over a scale 34. A shaft 35, mounted in bearings 36, has the inner ends of bimetallic spirals 37 and 38 affixed thereto. The outer end of the spiral 37 carries a laterally extending, rigid pusher 39, which projects through an open portion 40 of the disc and is adapted to thrust against the side of the pointer 32 and move it over the scale in a clockwise direction under conditions presently to be described.

The spiral 38 has its outer end affixed to the thermal jacket 41, which corresponds in construction and purpose to the previously described jacket 15. The two bimetallic spirals 37 and 38 both tend to turn the shaft 35 in the same direction under the influence of variations in ambient temperature.

With the outer end of the spiral 38 secured to the wall of the jacket 41, it follows that there will be no movement of the pusher 39 under the influence of ambient temperature, because if the variation in temperature is such as to tend to cause spiral 38 to unwind, such action will merely turn the shaft 35 in its bearings to a given extent, and since the spiral 37 will tend to unwind to exactly the same degree under the influence of the variation in ambient temperature, the pusher 39 will not move and will exert no thrust against pointer 32.

However, when spiral 37 no longer tends to change its form under the influence of ambient temperature, it then becomes, in a sense, a fixture with respect to shaft 35, and any additional movement of shaft 35 under the influence of heat delivered by the jacket 41 will be translated into movement of pusher 39, along with the shaft 35, to actuate the pointer.

Emphasis is placed upon the advantage of utilizing the full torque of two separate and individual elements, such as the shafts 7 and 18, in effecting movement of the indicating means, rather than to attempt to impose opposing torques upon a single element. By thus using the full torque effect of two identical bimetallic members, much more accurate results can be had than would be the case if opposed torques were imposed upon a single element. In this connection it may be pointed out that bimetallic elements of the character described have a limited range of movement, and as they reach the limit of movement their response to changes in temperature becomes greatly lessened.

It is to be understood that the invention is not limited to the precise construction set forth, but that it includes within its purview such changes as may fairly come within either the terms or the spirit of the appended claims.

Having described my invention, what I claim is:

1. A device of the character described comprising a pair of aligned shafts disposed end to end, a cylindrical metallic mass comprising means for electrically heating the same and into which one of said shafts extends, a thermally flexed spiral embraced by said mass, connected at its outer end to said mass and at its inner end to the last-named shaft, a pusher upon the inner end of the last-named shaft, a second thermally flexed spiral through which the other of said shafts extends and which is connected at its inner end to said shaft, means for anchoring the outer end of the last-named spiral, a graduated disc upon the last-named shaft, a pointer, movable over the graduations of said disc, with which said pusher has engagement in one direction of its movement only, and means for mounting said pointer frictionally with respect to the disc to adapt it to move with the disc or to be moved with respect to said disc under the influence of said pusher.

2. A device of the character described comprising a pair of aligned shafts disposed end to end, a cylindrical metallic mass comprising means for electrically heating the same and into which one of said shafts extends, a thermally flexed spiral embraced by said mass, connected at its outer end to said mass and at its inner end to the last-named shaft, a pusher upon the inner end of the last-named shaft, a second thermally flexed spiral through which the other of said shafts extends and which is connected at its inner end to said shaft, means for anchoring the outer end of the last-named spiral, a graduated disc upon the last-named shaft, a pointer, movable over the graduations of said disc, with which said pusher has engagement in one direction of its movement only, means for mounting said pointer frictionally with respect to the disc to adapt it to move with the disc or to be moved with respect to said disc under the influence of said pusher, and a second pointer constituting a part of said pusher and partaking of the movement thereof, the first-named pointer remaining in the position of maximum registration to which it is moved by the pusher, and the last-named pointer indicating the registration at any given movement, said thermally flexed spirals being of substantially identical expansive capacity for any given degree of heat.

3. An ampere demand indicator including a heated metallic mass comprising a resistance winding and a cylindrical shell for the same, a shaft extending through said mass, a bimetallic spiral, capable of being flexed under the influence of heat, having one of its ends attached to the inner wall of said mass and its other end attached to said shaft, a crank-like pusher upon the end of said shaft, a second shaft aligned with the first but otherwise independent with respect thereto, a second thermally flexed bimetallic spiral having its inner end secured to the last-named shaft and having its outer end anchored, a graduated disc fixed upon the last-named shaft, the last-named spiral being of substantially identical expansive capacity as the first-named spiral, a pointer frictionally mounted upon the last-named shaft and co-acting with said disc and against a side of which said pusher thrusts, the said spirals tending to move the disc and the pusher in the same direction, and the said spirals acting to cancel the effective action of ambient heat with respect to the indication of the pointer upon the disc, leaving such indication to represent only that degree to which the first-named spiral is moved under the influence of the heated mass beyond the point to which the disc was moved by the action of the second-named spiral.

4. An ampere demand indicator including a heated metallic mass comprising a resistance winding and a cylindrical shell for the same, means for connecting said winding to a source of current, the ampere output of which is to be measured, a shaft extending substantially axially through said mass, a bimetallic spiral capable of being flexed under the influence of heat having one of its ends attached to the inner wall of said mass and its other end attached to said shaft, said spiral being subject to the influence of heat from said mass and also to the influence of ambient heat entering through open ends of said cylindrical shell, a crank-like pusher upon the end of said shaft, said pusher comprising a portion extending laterally from said shaft having at its end a portion projecting in the general direction of the length of said shaft, a second shaft aligned with the first shaft but otherwise independent with respect thereto, a second thermally flexed bimetallic spiral having its inner end secured to the last-named shaft and having its outer end anchored and being freely exposed to ambient temperatures, a disc fixed upon that end of the last-named shaft which confronts the end of the first-named shaft, a scale upon that face of the disc remote from the heated mass, the two spirals being of substantially identical construction and expansive capacity, a pointer frictionally mounted upon the last-named shaft at that side of the disc nearest the heated mass and having a terminal indicating end projecting over said disc to coact with the scale upon the disc, that portion of the pusher which extends axially of its supporting shaft being disposed to engage a side of said pointer, the said spirals tending to move the disc and the pusher in the same direction, and the said spirals acting to cancel the effective action of ambient heat with respect to the indication of the pointer upon the disc, leaving such indication to represent only that degree to which the first-named spiral is moved under the influence of the heated mass beyond the point to which the disc was moved by the action of the second-named spiral.

KENNETH C. MARKLEY.